PATRICK R.J. COURT
CARL A.S. AKRELL
GABRIEL E. LOWITZ
INVENTORS.

BY Lyon & Lyon
ATTORNEYS.

RECEIVER ATTACHMENT

Filed Jan. 20, 1958 3 Sheets-Sheet 2

PATRICK R.J. COURT
CARL A.S. AKRELL
GABRIEL E. LOWITZ
INVENTORS.

BY Lyon & Lyon
ATTORNEYS.

RECEIVER ATTACHMENT

Filed Jan. 20, 1958 3 Sheets-Sheet 3

PATRICK R.J. COURT
CARL A.S. AKRELL
GABRIEL E. LOWITZ
INVENTORS.

BY Lyon & Lyon
ATTORNEYS.

United States Patent Office 3,041,389

Patented June 26, 1962

3,041,389

RECEIVER ATTACHMENT

Patrick R. J. Court, Los Angeles, Carl A. S. Akrell, Santa Ana, and Gabriel E. Lowitz, Los Angeles, Calif., assignors, by mesne assignments, to Paramount Pictures Corporation, New York, N.Y., a corporation of New York Filed Jan. 20, 1958, Ser. No. 709,979
12 Claims. (Cl. 178—5.1)

This invention relates to subscription television systems and, more particularly, to an attachment for a television receiver to enable its use in a subscription television system.

In a patent to David L. Loew et al., No. 2,769,023, for Prepaid Entertainment Distribution System, there is described a subscription television arrangement wherein a transmitter can transmit coded program video signals, price and program identification information, as well as program decoding signals to a plurality of receivers. The receivers owned by subscribers to the particular subscription television system have attachments to enable them to receive all of the signals. These subscriber receivers have a coinbox which, in response to the price signals, sets up a monetary demand. Upon payment or deposit into the coinbox of the amount indicated, the coinbox will actuate the receiver attachment to enable it to utilize the program decoding signals to allow the receiver to make an intelligible presentation of the program. In addition to the coinbox, there may also be present at each receiver a recording apparatus which, when payment of the amount of money requested has been made, is actuated to make a recording of the signals being transmitted which identifies the program being purchased.

In establishing a subscription television system in an area wherein prospective subscribers already have purchased the standard television receiver, it is desirable to provide an attachment for a receiver which can enable it to intelligibly receive signals from the subscription television system upon proper authorization, and yet at the same time can function to receive other channels than those allocated to the subscription television function. Receivers which are sold today have different circuit designs with different operating conditions. A great number of these are marginal in operations. Any connection made into a marginal operating receiver can affect operation adversely, and until corrected will create subscriber ill will. Therefore, it is preferable to have an attachment which does not require tampering with the inside of a subscriber receiver.

An object of the present invention is to provide an attachment for enabling a television receiver to be connected into a subscription television system without affecting the circuits of the television receiver or its normal operation.

In providing a subscription television system, for example, using a closed circuit which is in competition with free television program material, it is desirable to provide as much variety as possible in order to attract different subscribers having different tastes. To do this, one should transmit different subscription television programs simultaneously.

Another feature of this invention is the provision of a television receiver attachment which enables that receiver to receive more than one subscription television channel.

A further object of this invention is the provision of an attachment for a television receiver which can not only properly process and convert coded television video signals into signals which can be handled by the television receiver, but can also process signals for indicating the price of a subscription television program at the receiver, information identifying the program which has been purchased, and also for rendering audible audio signals which accompany the other signals, which audio signals are used as a "barker" for the various subscription television programs.

Still a further object of the present invention is to provide a novel, useful, and simple converter for use in converting a standard television receiver into a receiver for subscription television programs.

These and other objects of the invention are achieved by providing circuitry which has two channels. In one of these channels, pulse signals indicative of a program price, data to be recorded, and control signals are processed along with audio signals representative of the barker. The processing includes the proper demodulation of these signals and filtering, as well as application to the apparatus which operates in response to these various signals. A second channel is provided including switching apparatus, which processes the program television signals and their accompanying sound received from the various subscription television channels. Means is provided for selecting the signals of the desired subscription television channel and for converting these signals into signals which can be applied to the antenna terminals of a television receiver for viewing, after the proper payment for the program selected has been made.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

As previously indicated, the embodiment of the invention herein comprises apparatus commonly termed a converter, which is connected to a television receiver for the purpose of enabling it to be employed in a subscription television system. In order to better understand the utilization and operation of the converter, some explanation of the transmitter used in subscription television systems and the nature of the signals is first required. Accordingly, reference is made to FIGURE 1, which shows a type of transmission arrangement which may be employed.

First, by way of example, let it be assumed that it is desired to have three separate subscription television channels. In accordance with the presently accepted practice by the Federal Communications Commission of the United States Government, despite the fact the present television receivers are tunable to reach the received Channels 2 through 13, usually at most 7 of the 13 channels are assigned to free television broadcasting in a given area to prevent adjacent channel interference. In accordance with this invention, the three different subscription television channels may be individually selected and are converted at the receiver to a channel frequency which is is not assigned to any of the free television prigram broadcasts in the particular area.

Figure 1:
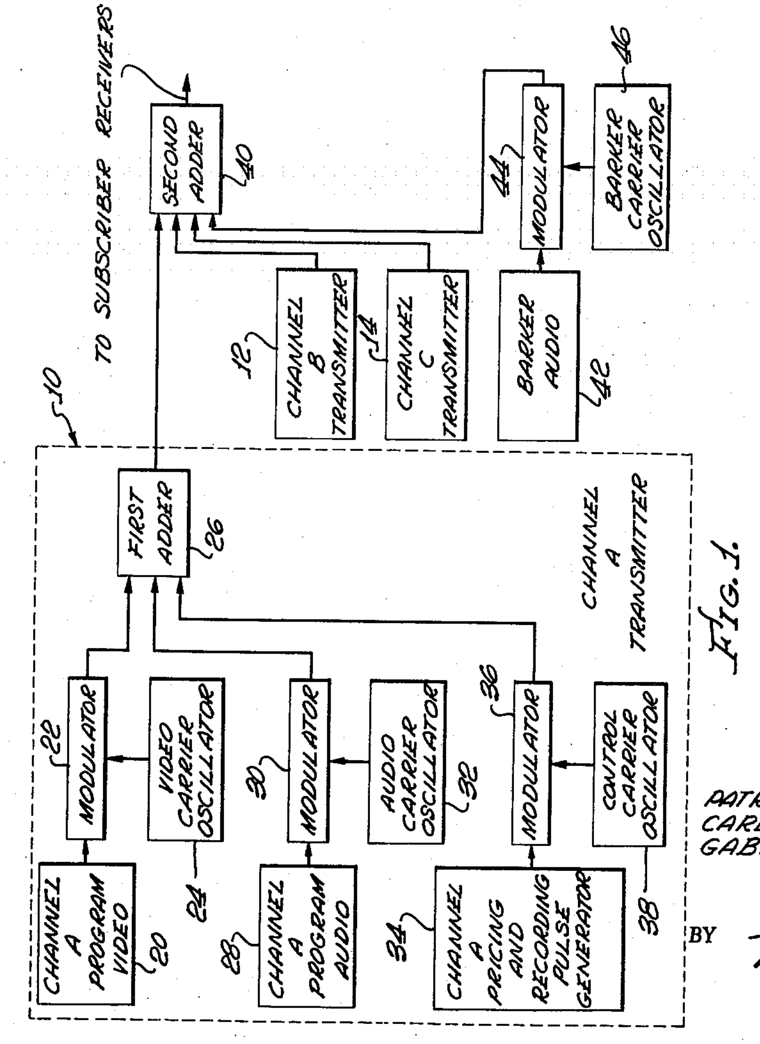
FIGURE 1 represents a block diagram of a transmitter for transmitting signals in a subscription television system in which the embodiment of the invention is employed.

Referring now to FIGURE 1, there is shown a block diagram of three subscription television transmitters which send three different programs on three different carriers.

These three transmitters are respectively designated as Channel A, Channel B, and Channel C. The use of three channels is merely by way of illustration, and not to be construed as a limitation. The Channel A transmitter 10 is illustrated in greater detail than the Channel B transmitter 12 and the Channel C transmitter 14, since the channels B and C transmitters are substantially identical with the channel A transmitter, except for a difference in the carrier frequencies employed.

Channel A transmitter 10 includes a source of program video signals 20, which are derived in the well-known manner from the output of the camera and the sync signal generators. The output of the source of program video signals are applied to a modulator 22, which modulates these upon oscillations derived from a video carrier oscillator 24. The output of the modulator is applied to a first adder 26. Similarly, a source of program audio signals 28 applies its output to a modulator 30, which modulates these audio signals upon the output of an audio carrier oscillator 32. The output of the audio modulator 30 is also applied to the first adder, to be combined with the output of the modulator 22.

Accompanying the video and audio signals are the pricing and recording pulses. These are generated by a pricing and recording pulse generator 34, the output of which is applied to a modulator 36, which modulates these pulses upon the oscillations received from a control carrier oscillator 38. The output of the modulator 36 is also applied to the first adder to be combined with the other signals applied to its input. The pricing and recording pulse generator may be any source of these pulses, such as a magnetic drum, upon which the proper number and shapes of pulses have been recorded, or an endless loop of magnetic tape or punched tape suitable for the provision of these pulses.

The output of the first adder is applied to a second adder 40, which also receives as its input signals from a channel B transmitter and a channel C transmitter. Also applied to the second adder are barker audio signals which have been modulated on a carrier. The barker audio signals are derived from a barker audio signal source 42, the output of which is applied to a modulator 44, which modulates these audio signals upon the oscillations received from a barker carrier oscillator 46. Barker audio comprises usually either laudatory or descriptive statements made concerning the virtues of the programs being transmitted on any one of the three channels. Also special announcements, such as times of showing and prices, or any future event which should be brought to the attention of the subscriber, may be included in the barker audio. This type of information may be repeated by an announcer, or may be recorded and reproduced when required.

By way of example of the frequencies selected for a system, but not to be construed as a limitation, the video carrier frequency selected for Channel A was 19.25 megacycles; the audio carrier frequency selected for Channel A was 14.75 megacycles. The video carrier for Channel B was 27.125 megacycles; the audio carrier for Channel B was 22.625 megacycles. The video carrier for Channel C was 37.5 megacycles; the audio carrier for Channel C was 33 megacycles. The control carrier frequency for Channel A was 10.4 megacycles; the control carrier frequency for Channel B was 10.45 megacycles; the control carrier frequency for Channel C was 10.5 megacycles. The frequency selected for the barker carrier was 10.3 megacycles. These carriers are chosen below FCC Channel 2 to provide maximum efficiency in cable transmission, and to prevent their being receivable by a normal television receiver. The exact choice of frequencies depends upon many factors, which are of no concern here.

Figure 2:
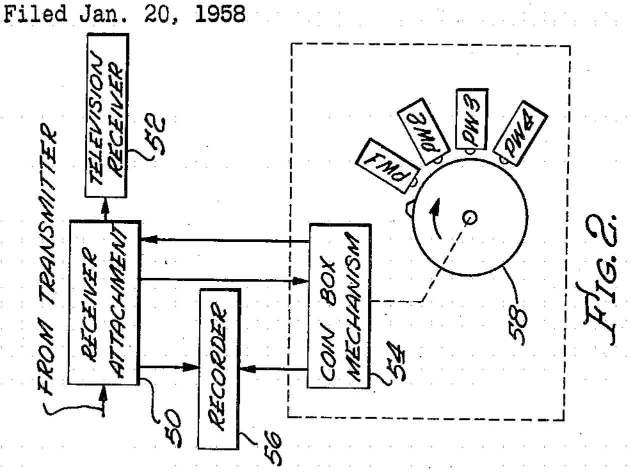
FIGURE 2 is a block diagram of an embodiment of the invention to be attached to a standard television receiver in order to enable it to be used in a subscription television system.

The output of the second adder 40 is applied to a coaxial cable, which is connected to a plurality of receiver installations. In the event that the coaxial cable also carries the regular FCC "free" channels, the cable may be connected to both nonsubscribers and subscribers to the subscription television channels. At a subsecriber receiver, the apparatus shown in FIGURE 2 is found. This includes the receiver attachment 50, which is a block designating the embodiment of the invention. The receiver converter is connected to the cable from the transmitter, and its output is applied to the antenna terminals of the receiver 52. Also present at a subscriber receiver is a coinbox 54 and the recorder 56. An example of the recording and coinbox mechanism which may be employed is shown and described in the patent to Del Riccio et al., No. 2,769,024, for a Television Control System. The arrangement described therein is also for a subscription television system, and there is shown a coinbox which is actuated in response to pulses from the transmitter and a magnetic tape recorder for recording program identification information. A preferred embodiment of a coinbox is shown, described, and claimed in an application by John Nyberg, for a Coinbox for Subscription Television Receiver, Patent No. 2,966,980. The coinbox includes a rotating switch 58 which is actuated by the coinbox mechanism. In the "blank" or unactuated position, the rotating switch closes two contacts PW1 and PW2. In a paid-1 position, two further contacts PW3 and PW4 are closed. In a paid-2 position, only contact PW4 remains closed. This will all become more clear as the explanation progresses.

The receiver attachment includes means to tune any one of the three subscription television channels. The receiver 52, at that time, should also be tuned to the television channel allocated to receive the subscription television program. Thus, if the receiver attachment 50 is tuned to Channel A, the coinbox will indicate, in response to Channel A pricing pulses, the price which must be paid before the program can be seen. A price-indicating wheel in the coinbox in response to the pricing pulses is moved from a blank position to a position indicating the price demanded. If channel B is selected, or channel C, the coinbox would then indicate the corresponding price requested for the program on the channel selected. Upon payment of the price demanded into the coinbox 54, the coinbox price-indicating wheel will be moved to a paid position in response to the deposit of the required coinage. This paid position will be designated as the first paid position. At that time, contacts PW4 are closed, which enables the receiver attachment to operate to convert the program video and audio signals from the carriers on which they are received, which, in view of the frequency selection for the respective audio and video carrier oscillators, comprises a full bandwidth visual and audio carrier, to the full bandwidth visual and audio carrier for channel 6. If the receiver is tuned to channel 6, it can then handle the signal received in the usual manner, to present the program.

Meanwhile, the contacts PW3 and PW4 are closed. The closure of PW3 contacts actuates recorder 56 and it will receive recording pulses from the receiver attachment 50, representative of program identification information. When the recorder has recorded this information, it signals the receiver attachment to advance the coinbox from its first paid position to a second paid position, whereby contacts PW3 are opened and the recorder mechanism is rendered inoperative. Contacts PW4 remain closed, however.

Figure 3:
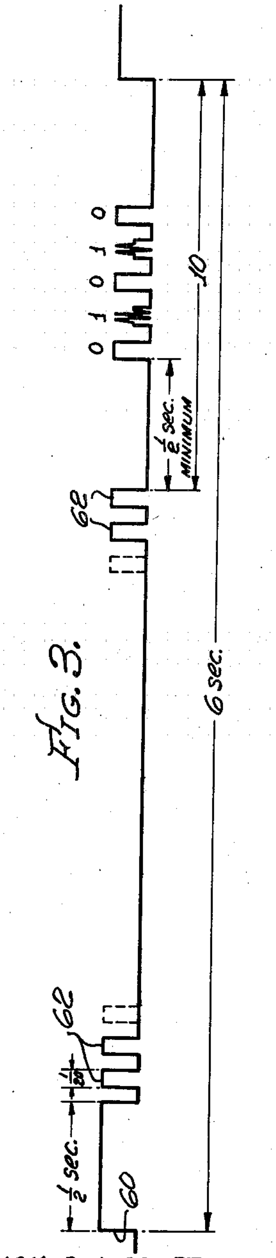
FIGURE 3 is a wave-shaped diagram of the control, pricing, and recording pulses which is shown in order to assist in an understanding of this invention.

Pricing and recording information are sent repetitively every six seconds. As shown in FIGURE 3, a typical pricing and recording cycle includes a first pulse in the sequence, which is known as the start-pricing pulse 60, and lasts for a half a second duration. This is followed by pricing pulses 62, which are $\frac{1}{20}$ of a second long and are spaced apart $\frac{1}{20}$ of a second. A maximum of 40 pricing pulses are transmitted. An end-pricing interval of at least half a second will follow the last, or fortieth, pricing pulse, if such fortieth pricing pulse is present. Otherwise, the pricing interval, including the end-pricing interval, is constant regardless of the number of pricing pulses being transmitted.

Following the end-pricing interval is a code sequence of up to ten binary digits comprising zeros and ones. These represent the program-identification data. In this code sequence, a pulse representing zero is substantially the same amplitude and width as the pricing pulse, and a pulse representing one is a pulse having half the amplitude of the pulse representing zero. In addition, a low-frequency tone is modulated on the plateau of the half-amplitude pulse. The peak-to-peak amplitude of the tone will be the same as the amplitude of the zero-representative pricing pulse.

Figure 4A:
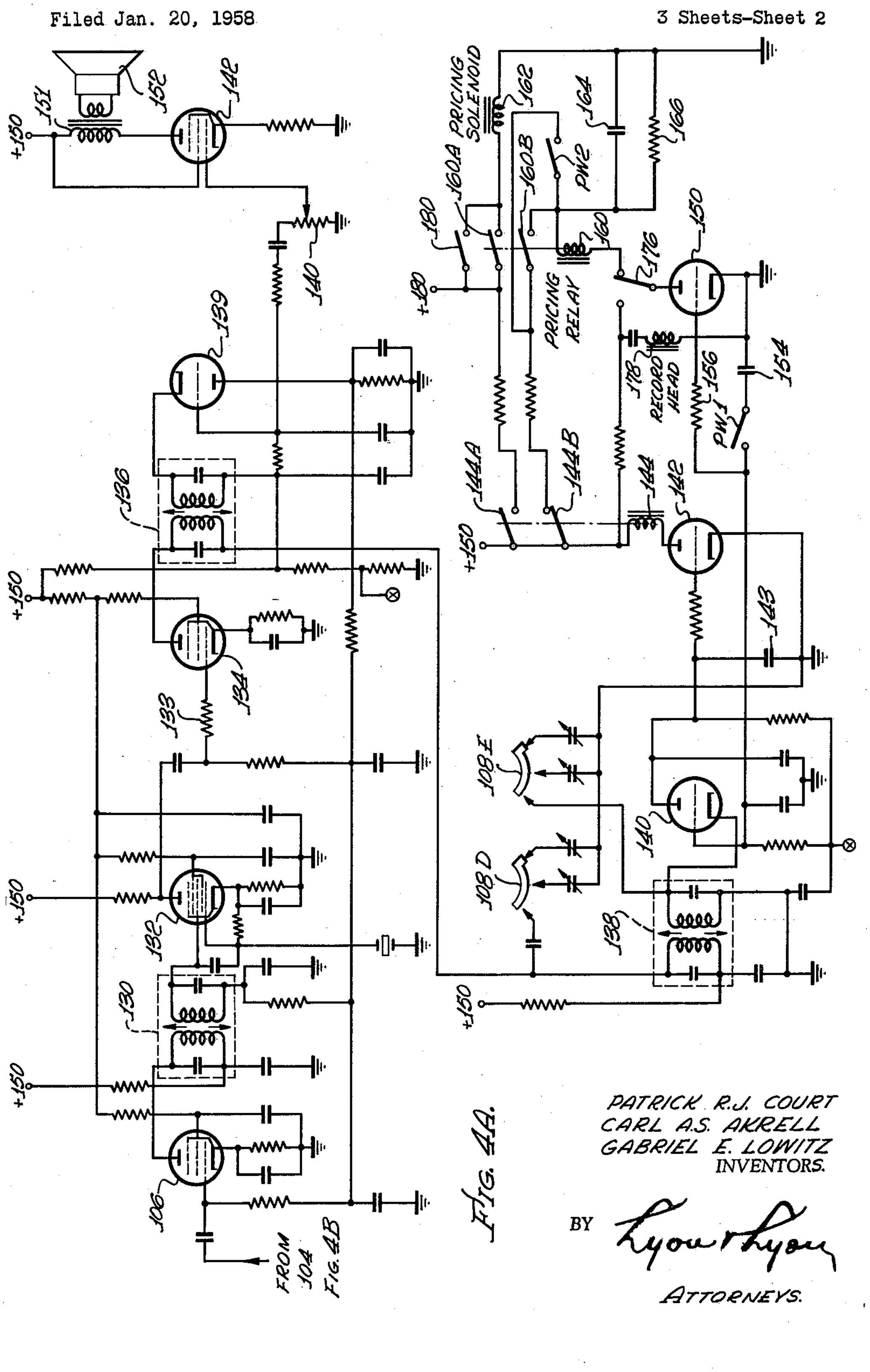
FIGURES 4A and 4B are a circuit diagram of an embodiment of this invention.
Figure 4B:
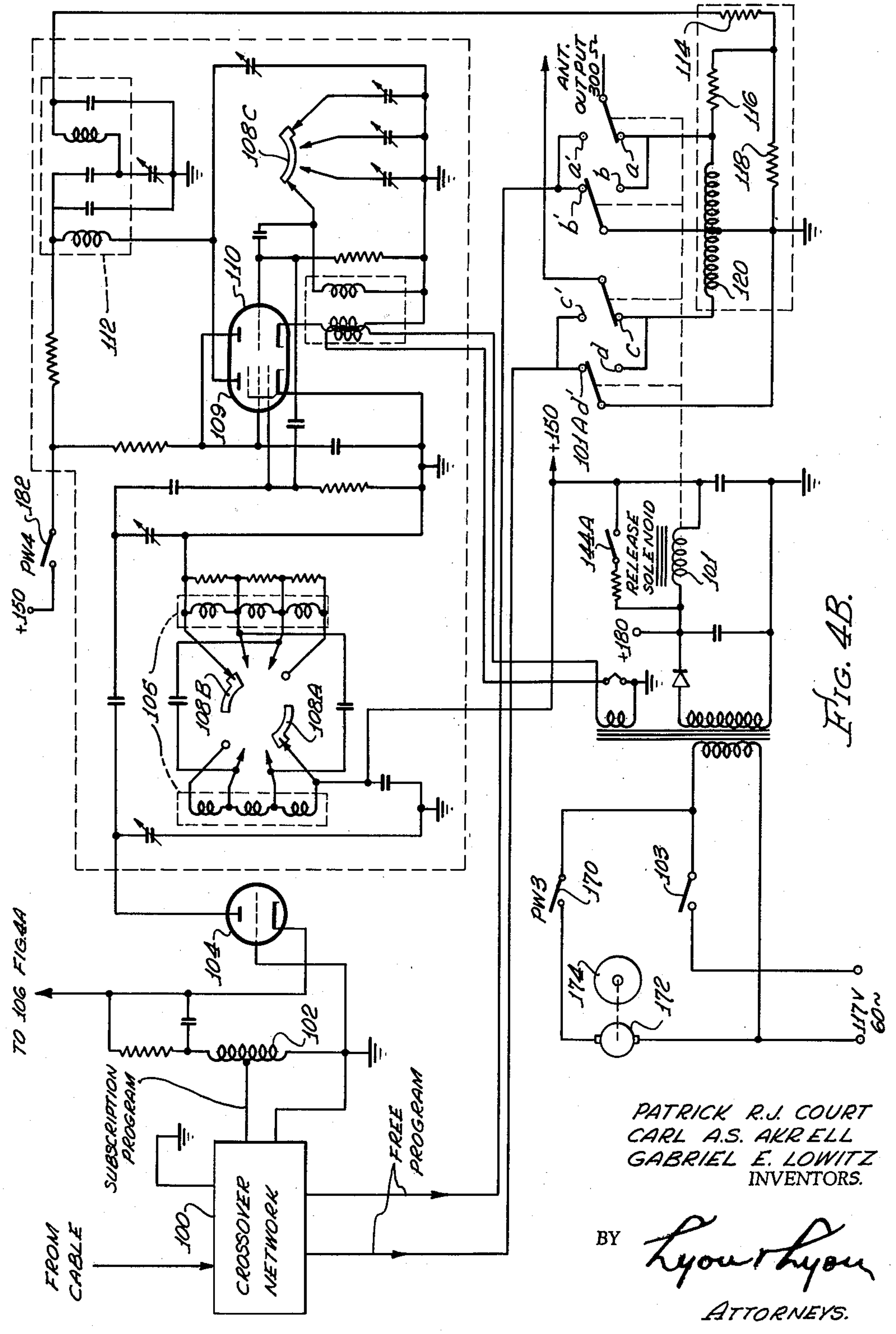

Reference is now made to FIGURES 4A and 4B, which show a circuit diagram of a receiver attachment in accordance with this invention. As previously described, this receiver attachment will have two channels; in one channel, shown in FIGURE 4A, there will be handled the control signals, including the pricing and program identification pulses, and barker audio signals; in the second channel, shown in FIGURE 4B, there will be handled the video and audio signals of the program.

All signals are received from the cable which is coupled to the television transmitter station. Considering first FIGURE 4B, since the cable may also carry other programs than the three subscription television programs in channels A, B and C, for example, the regular free programs in the VHF bands, it is necessary to interpose a crossover network 100, which serves the function of permitting only the three subscription television channel frequencies to be applied to the converter unit and to bypass all the free program channels. In the event that only the subscription television channels are on the coaxial cable connected to the transmitter, then no crossover network need be employed. The free program output of the crossover network is applied to the upper contacts *a'*, *b'*, *c'*, *d'* of an antenna switch 101A. In the event that the subscriber receives free programs from an outside antenna, the antenna output would be connected to the contacts *a'*, *b'*, *c'*, *d'*. In this event, also, the crossover network would be superfluous, and the low-frequency subscription television channels would be connected directly into input coil 102. The subscription television program output of the converter is applied to the lower contacts *a*, *b*, *c*, *d*, of the antenna switch 101A. The swinger arms which contact the *d*, *d'* and *b*, *b'* contacts are connected to ground. The swinger arms which contact the *a*, *a'* and *c*, *c'* contacts are connected to the antenna input terminals of the receiver. The antenna switch may be either manually operated or automatically operated. In the embodiment shown in FIGURE 4B, the antenna switch is automatically operated by the release solenoid 101. The release solenoid serves the function, when it is energized, of preventing the price-indicating wheel mechanism operating switches in the coinbox from returning to the unpaid, or "blank," position. The release solenoid also serves as a filter choke in the power supply for the receiver attachment, and thus is normally energized by the B+ current consumed by the attachment. Thus, when the attachment is switched on in readiness to receive the subscription television programs, the solenoid is energized, and the antenna switch connects the television receiver antenna terminals to the subscription television output from the attachment. Simultaneously, the free program input is disconnected and shorted to ground. When the release solenoid 101 is not energized, either when the attachment is switched off, or when the solenoid is short-circuited by relay contacts 144A, the television receiver antenna terminals are connected to the source of free programs, and the subscription television output is shorted to ground. Switch 103 is used to turn on the power and thus energize solenoid 101. In FIGURE 4B, the contacts of antenna switch 101A are shown in the position assumed when release solenoid 101 is energized.

The subscription television signals received from the low-frequency side of crossover network 100 are applied to a two-to-one stepup transformer 102. The output of the stepup transformer is applied to both channels in the receiver attachment. The second channel includes a grounded grid triode tube 104, which serves as a terminating impedance. The first channel includes a pentode tube 106, and the output from transformer 102 is also applied to its grid. The output of the grounded grid triode 104 is applied to an incremental tuning network 105, which is varied in well-known manner by varying a multideck selector switch 108. The decks 108A and 108B are used to select the video-audio signals received from either channel A, channel B, or channel C. The bandwidth which was selected for each one of the video and audio carriers employed is such that for each channel the video carrier is at the upper end of the response and the audio carrier is about 2 db down. Effectively, therefore, each one of the channels may be considered as handling a full bandwidth visual and aural carrier which enables it to be also employed to handle color television, if required.

The incremental tuning network 105 is connected to the grid of a pentode tube 109 to tune its grid. It should be noted that B+ is not applied to either tube 109 or a following oscillator tube 110 until the PW4 switch contacts are closed. As previously indicated, this will occur upon the payment of a coin demand. Selector switch 108, which has a plurality of selector decks which are ganged together and simultaneously operable, and respectively designated as deck A, B, C, D, and E. Decks A and B of selector switch 108 are employed for selecting taps on the grid tuning inductance. This arrangement is well known, and it is not deemed further explanation is required here. A triode tube 110 is tuned to oscillate at the proper conversion frequency by means of the deck C of selector switch 108, which selects a proper one of the condensers connected thereto to tune the grid tank circuit. This arrangement is well known and need not be further described here. The output of tube 110 is fed to the monitor tube 109, together with the video and audio carriers selected by switch 108. The output of tube 109 will comprise the visual and aural carrier to which the television receiver is tuned. Effectively, tubes 109 and 110 comprise a triode oscillator pentode converter combination.

The channel to which the subscriber receiver is tuned (either channel 5 or 6, whichever is available) determines the tuned frequency of the double-tuned bandpass circuit 112, to which the output of tube 109 is applied. The bandwidth of the bandpass circuit is established as six megacycles. The output of the bandpass filter is applied to a T arrangement of resistors 114, 116, and 118, which serve the function of matching the impedance of the converter to the antenna of the receiver and also to attenuate the signal being applied to the antenna input to the receiver to a sufficient value not to overload the receiver. These resistors also isolate the network 112 from any mismatch due to the input impedance of the television receiver. The impedance at the output of the resistor T-pad is increased four times by means of another impedance matching transformer 120, which couples the resistors to the contacts of antenna switch 101.

Consideration will now be given to the channel which handles the control and barker signals. The carrier frequencies for the control signals in the barker are grouped close together around a frequency of ten megacycles. As previously described, the tube 106 amplifies the barker and control signals. The plate of this tube has a double-tuned ten megacycle transformer 130, which causes a stepup of the received signal by approximately a ratio of 100 to 1. These signals include the three types of pulse signals, as well as the barker signals, on four different carriers. Tube 132 and its attendant circuitry serves the function of the typical pentagrid converter. The cathode and control grid are coupled in a well-known crystal oscillator circuit, oscillating at a frequency of 10.05 megacycles.

The input to the tube 132 from the transformer 130 will consist of the barker 10.3 megacycle carrier, as well as all three of the channel A, B, C control carriers which are at a frequency of 10.4 megacycles for channel A, 10.45 megacycles for channel B, and 10.5 megacycles for channel C. As a result, channel A control signals are converted to 350 kc.; channel B control signals are converted to 400 kc.; channel C control signals are converted to 450 kc.; and barker is converted to 250 kc. All these signals are applied to the tube 134, where they are all amplified further.

There are two IF transformers 136, 138, connected in series with each other and with the plate of tube 134. The first IF transformer 136 is fixed-tuned to the barker IF frequency, namely, 250 kc. The second IF transformer 138 is switch-tuned by means of the two decks 108D and 108E, which select condensers for tuning the primary and secondary of the IF transformer 138 to whichever one of the channels A, B, C has been selected. It should be noted that the oscillation frequency of 10.05 megacycles is bypassed at the input of tube 134 by the filter action provided by the input resistor 133, coupled to the grid of the tube 134, plus the internal capacitance of the tube.

A tube 139 serves as the barker and automatic gain control detector. Input to this tube is applied to its cathode from the secondary of the IF transformer 136. Audio output from the tube is derived from its grid and is applied to a potentiometer 140, which serves as a volume control. Potentiometer 140 is connected to the grid of an audio amplifier 142, which in turn feeds an output transformer 151 and loudspeaker 152 with barker audio information. The output of tube 139 is also employed for providing a delayed automatic gain control signal. This automatic gain control signal, or AGC as it is commonly known, is derived from the plate of tube 139 and is applied through the usual AGC networks to the grids of tubes 106, 132, and 134. Thus, the barker carrier supplies AGC for both the barker and control signals.

It should be noted here that the pulse information comprising the long starting pulse, the pricing pulses, and the pulses identifying the program which is purchased are negatively modulated and also 100 percent modulated on the carrier. This means that substantially zero carrier represents a peak positive pulse and maximum-carrier represents a peak negative pulse. The output of the IF transformer 138 is applied to the cathode of a detector tube 140. Actually, tube 140 is employed in a manner similar to tube 139, wherein the input signal is applied to its cathode, and detection for one purpose occurs between cathode and anode and for another purpose between cathode and grid. Considering the cathode and grid of tube 140, this diode arrangement is employed for detecting the presence of the pricing and program-identification pulses. The diode arrangement between cathode and anode of tube 140 is employed for the purpose of detecting the presence of any pulses for use as a monitor control. The pricing pulse detection is a short-time-constant type of detection, and the monitor pulse detection is a long-time-constant type of detection.

The output of the anode of tube 140, consisting of the monitor control pulses, is applied to the grid of a control or monitor tube 142. This tube has a relay solenoid 144 in series with its anode. Tube 142, in the absence of any negative monitor signal, is maintained conducting. Thereby, it can energize the relay 144, which is in series with its anode, as a result of which contacts 144A are closed and contacts 144B are maintained open. Upon the tube 140 detecting control pulses, these are integrated by the condenser 143, which is connected in the grid of tube 142. Thereby, tube 142 is biased off; the relay 144 is rendered inoperative; and the contacts 144A and 144B assume the position shown.

When the coinbox 54 is in its blank or no-price-indicating position, switch contacts PW1, which are in series with the integrating condenser 154, are in a closed position. Condenser 154, in combination with a resistor 156, function to integrate and detect the starting long pulse, which is received from tube 140. The resulting voltage enables tube 150 to become conductive. At this time, it should be again noted that in view of the negative modulation of the signal upon the carrier, the presence of a pulse is represented by a zero D.C. signal, and the absence of a pulse is represented by a negative D.C. signal. Thus, tube 150 is made to conduct in the presence of a pulse and is cut off in the absence of a pulse. In the case of the pulses which are recorded, the zero pulses enable tube 150 to be conductive, and the one pulses, which are the half-amplitude pulses with a sine wave modulation on their plateaus will be transmitted by tube 150 as that modulation.

The time constants of resistor 156 and condenser 154 are selected to insure that only a long starter pulse will provide sufficient voltage to make tube 150 conductive. Thereby, the tube will only commence conduction at the beginning of a train of pulses and not in the middle of a pulse train. A pricing relay coil 160, which is in the anode of tube 150, operates to close contacts 160A and 160B when the tube becomes conductive. Contacts 160A allow the application of current to a pricing solenoid 162. This pricing solenoid advances the coinbox mechanism from off the blank position, whereby contacts PW1 will open. This removes condenser 154 from the input to the grid of tube 150, whereby it can thereafter become responsive to pricing and program-indicating pulses, which are much shorter than the starting pulse.

Switch contacts PW2 are closed so long as the coinbox pricing wheel remains on the blank position. This enables the application of a charging voltage to a condenser 164. This condenser 164 provides the B+ potential for tube 150. Thereby, tube 150 can be rendered conductive by signals applied to its grid. However, once the pricing solenoid 162 has been energized, whereby the pricing wheel contacts PW2 are opened, and charging voltage for condenser 164 is obtained through contacts 160B of relay 160. It should also be noted that contacts 160B connect to B+ through contacts 144B of relay 144. These contacts are closed so long as monitor tube 142 is biased beyond cutoff by the monitor signal received from the detector 140. A discharge resistor 166 is connected in shunt with condenser 164. The value of this resistor is selected so that during the occurrence of pricing pulses, the interval between the pricing pulses, and hence the time during which contacts 160B are open is too short to enable condenser 164 to be completely discharged through the resistor 166. However, at the termination of the pricing interval, there is an interval of one-half second minimum, which causes condenser 164 to be discharged. Thereafter, tube 150 will not derive any plate voltage from this condenser, and such plate voltage must be obtained from another source if the tube is to be operative during the recording pulse interval.

At the termination of the pricing sequence, when the pricing solenoid has been operated a number of times necessary to advance the coinbox indicator to the amount required to be paid for the program, even though recording pulses are being received, tube 150 is not responsive thereto, since condenser 164 is completely discharged. When the amount of money required has been deposited, the coinbox mechanism advances to the "first paid" position. At this time, it closes contacts PW3 and PW4. Contacts PW3 (FIGURE 4B) apply power to a recording motor 172. The recording motor drives a cam 174, which operates a switch 176 which is connected to the anode of the tube 150, to connect a source of B+ to the tube 150 and to connect the recording head 178 of the tape recorder to the anode of the tube 150. A recording of the pulses of sine wave modulation and zero pulses is made, and the cam 174 thereafter restores the switch 176 to its previous position. The cam 174 thereafter immediately operates another pair of switch contacts 180 to be closed. Contacts 180, upon being closed, apply an energizing signal to the pricing solenoid 162. This serves the function of advancing the coinbox to its second paid position, at which position contacts PW3 are opened. The cam 174 coasts a sufficient amount thereafter to open contacts 180 again.

Contacts PW4 remain closed to allow the application of B+ to tubes 109 and 110, whereby the video and audio carriers are converted to a frequency which can be handled by the subscriber's television set. The release solenoid 101 is short-circuited whenever contacts 144A of relay 144 are closed. It will be recalled that this relay is rendered operative in the absence of control pulse signals. Therefore, at the end of a program, control pulses are no longer transmitted, at which time the tube 142 can again become conductive, whereupon contacts 144A are closed, short-circuiting release solenoid 101, which permits the coin mechanism price indicator to return to the blank position.

Simultaneously, contacts 144B are opened, denying B+ to tube 150. When the control pulses from the transmitter are reinstated, tube 142 again becomes conductive, allowing contacts 144A to open again, and 144B to close again. Tube 150 is then again responsive to a long starter pulse, and a new pricing sequence will begin.

Effectively, therefore, the arrangement described above comprises a converter system wherein signals from the transmitter comprising a first and a second carrier respectively having barker audio signals modulated thereon and pricing and recording signals modulated thereon, and a third and fourth carrier respectively having video and audio signals modulated thereon, are directed through two channels, one of which presents the signals and applies the pricing and recording signals to pricing and recording apparatus, which further operates when the price indicated has been paid to make a record of the recording information and enable the video and audio signals to be converted to a carrier, whereby the ordinary television receiver can handle them. The presence of pricing and recording signals automatically conditions the converter to handling the subscription television signals. In the absence of control signals, or when the attachment is switched off, the subscriber receiver can receive free television programs.

I claim:

1. In a subscription television system of the type wherein there are transmitted barker audio signals modulated on a first carrier, control signals on a second carrier, program video and audio signals respectively on a third and fourth carrier, the frequencies of said third and fourth carriers being selected to have values such that a commercial television receiver cannot intelligibly reproduce said program video and audio signals, an attachment for integrating a commercial television reciever into said subscription television system to comprising a first and second channel to which all said transmitted signals are applied, said first channel having means for converting the carrier frequency of said first barker audio signals to a first intermediate frequency and the carrier frequency of said control signals to a second intermediate frequency, means to which the output of said means for converting is applied for detecting said barker audio signals from said first intermediate frequency, means to which the output of said means for detecting said barker audio signals is applied for reproducing said detected barker audio, means to which output from said means for converting is applied for detecting said control signals from said second intermediate frequency, normally inoperative means to establish a coin demand responsive to the content of said control signals, means to which detected control signals are applied to render said normally inoperative means operative responsive to said control signals, and means for acknowledging payment of said coin demand; said second channel having means rendered operative responsive to operation of said means for acknowledging said coin demand payment to convert the frequencies of said third and fourth carriers to carrier frequencies which a commercial television receiver can intelligibly reproduce and means to apply said converted third and fourth carrier frequencies to the antenna input of said commercial television receiver.

2. In a subscription television system of the type wherein there are transmitted barker audio signals modulated on a first carrier, control signals in repetitive pulse trains on a second carrier each pulse train including a first pulse which is relatively long compared to the following pulses, and program video and audio signals respectively modulated on a third and fourth carrier, the frequencies of said third and fourth carriers being selected to have values such that a commecial television receiver cannot intelligibly reproduce said program video and audio signals, an attachment for integrating a commercial television receiver into said subscription television system comprising a first and a second channel to which all said transmitted signals are applied said first channel having means for converting the frequencies of said first and second modulated carriers to first and second intermediate frequencies, means for detecting said barker audio from said first intermediate frequency, means for applying first and second intermediate frequencies from said means for converting to said means for detecting said barker audio, means for reproducing said detected barker audio, means for applying said detected braker audio to said means for reproducing said detected barker audio, means for detecting said control signals, means for applying the second intermediate frequency from said means for converting to said means for detecting said control signals, means to which said detected control signals are applied to integrate said detected control signals, normally inoperative means to respond to other pulses than said first pulses in a pulse train for establishing a coin demand, means to render said last-named normally inoperative means operative responsive to operation of said means to integrate and to one of said first pulses, and means for acknowledging payment of said established coin demand; said second channel having means rendered operative responsive to operation of said means for acknowledging payment of said coin established demand to convert the frequencies of said third and fourth carriers to carrier frequencies which a commercial television receiver can intelligibly reproduce, and means to apply said third and fourth converted carrier frequencies to the antenna input of said commercial television receiver.

3. In a subscription television system as recited in claim 2 wherein said means to integrate said detected control signals includes an integrating network, a first electron tube, means for coupling said first tube to said network to be responsive to output from said integrating network, a relay having contacts, a source of operating potential connected to said contacts, and means for coupling said relay to said first tube to close said relay contacts when said first tube responds to said integrating network, and said normally inoperative means to respond to other pulses than said first pulses in a pulse train for establishing a coin demand includes a second electron tube, means for deriving operating potential for said second electron tube through the contacts of said relay, an integrating condenser, switch means coupling said integrating condenser to the input to said second integrating tube, and means responsive to operation of said second tube to open said switch means, whereby said second tube can respond to pulses other than said first pulse in said control signal pulse train for establishing a coin demand, as long as said integrating network continues to provide an output for maintaining said first tube responsive thereto.

4. In a subscription television system of the type wherein there are transmitted barker audio signals modulated on a first carrier, control signals in repetitive pulse trains on a second carrier, each pulse train including pulses representing a coin demand followed by pulses identifying a program, and program video and audio signals respectively modulated on a third and fourth carrier, the frequencies of said third and fourth carriers being selected to have values such that a commercial television receiver cannot intelligibly reproduce said program video and audio signals, an attachment for integrating a commercial television receiver into said subscription television system comprising a first and second channel to which all said transmitted signals are applied, said first channel having means to convert the frequencies of said first and second modulated carriers to first and second intermediate frequencies, means coupled to said means to convert for detecting said barker audio from said first intermediate frequency, means coupled to said means for detecting said barker audio for reproducing said detected barker audio, means coupled to said means to convert for detecting said control signals, means coupled to said means detecting said control signals to integrate said detected control signals, normally inoperative circuit means to respond to said coin demand representative pulses to establish a coin demand, means to render said normally inoperative circuit means operative responsive to said means to integrate and to the commencement of a pulse train, means for acknowledging payment of said established coin demand, normally inoperative means for recording said program identification pulses, means for rendering operative said normally inoperative means for recording responsive to operation of said means for acknowledging payment of said coin demand, and means to apply said program identification pulses to said means for recording through said circuit means responsive to operation of said means for acknowledging payment of said established coin demand; said second channel having means rendered operative responsive to operation of said means for acknowledging coin demand payment to convert the frequencies of said third and fourth carriers to carrier frequencies which said television receiver can intelligibly reproduce, and means to apply said converted third and fourth carrier frequencies to the antenna input of said commercial television receiver.

5. In a subscription television system as recited in claim 4 wherein said circuit means includes an electron tube having anode, cathode and control-grid electrodes, a relay having a first set of contacts which are open when said relay is not operated, means coupling said relay to said tube for operation responsive to said tube operation, a source of tube operating potential coupled to said first set of relay contacts, a condenser connected between said tube anode and cathode, a discharging resistor connected across said condenser, said resistor and condenser values being selected to provide a discharging time constant longer than the interval between pulses representing coin demand, means to apply tube operating potential to said condenser through said first set of relay contacts when they are closed, and means to apply tube operating potential to said condenser only before operation of said tube in response to a pulse train is commenced.

6. In a subscription television system as recited in claim 5 wherein said means to apply said program identification pulses to said means for recording through said circuit means responsive to operation of said means for acknowledging payment of said coin demand includes switch means operable upon operation of said means for acknowledging payment of said coin demand to connect said source of operating potential to said tube and to connect output from said tube to said means for recording.

7. In a subscription television system of the type wherein a subscriber is required to pay for a program and wherein from a transmitter there are transmitted control signals and program signals in a manner such that a commercial television receiver is unable to reproduce the program intelligibly, receiver attachment means for enabling any commercial television receiver having antenna terminals for receiving television broadcasts to be integrated into said subscription television system comprising means for receiving said program signals and control signals, inoperative means to which said received program signals are applied for translating said program signals to signals which can be intelligibly reproduced by a television receiver, means operated by a subscriber for indicating assumption of payment for said program, means for rendering said inoperative means for translating operative responsive to said means for indicating assumption of payment for said program being operated, means connecting the output of said inoperative means for translating to the antenna terminals of said receiver, and means to which said control signals are applied for maintaining said inoperative means for translating operative responsive to said control signals.

8. In a subscription television system of the type wherein a subscriber is required to pay for a program and wherein there are transmitted from a transmitter control signals and program signals in a manner such that a commercial television receiver is unable to reproduce the program intelligibly, receiver attachment means for enabling any commercial television receiver having antenna terminals for receiving television broadcasts to be integrated into said subscription television system, said attachment means having means for receiving said program signals and control signals, inoperative means to which said received program signals are applied for translating said program signals to signals which can be intelligibly reproduced by a commercial television receiver, means responsive to said received control signals and an operation by a subscriber for indicating assumption of payment for said program, means for rendering said inoperative means for translating operative responsive to said means for indicating assumption of payment for said program being operated, and means for applying the output of said inoperative means for translating to said antenna terminals.

9. In a subscription television system of the type wherein a subscriber is required to pay for a program and wherein there are transmitted by a transmitter control signals and program signals in a manner such that a commercial television receiver having antenna terminals for receiving television broadcasts is unable to reproduce the program intelligibly, receiver attachment means connected to said antenna terminals for intercepting signals from said transmitter for enabling any commercial television receiver to be integrated into said subscription television system, said attachment means having means for receiving said program signals and control signals, inoperative means to which said program signals are applied for translating said received program signals to signals which can be intelligibly reproduced by a commercial television receiver, means connecting the output of said inoperative means for translating to said antenna terminals, means responsive to said control signals and an operation by a subscriber for indicating assumption of payment for said program, means for rendering said inoperative means for translating operative responsive to said means for indicating assumption of payment for said program being operated, means for maintaining said inoperative means operative responsive to said received control signals, and means for applying said received control signals to said means for indicating assumption of payment and to said means for maintaining said inoperative means operative.

10. In a subscription television system of the type wherein a subscriber is required to pay for a program and wherein there are transmitted by a transmitter program signals in a manner such that a television receiver having antenna terminals for receiving television broadcasts is unable to reproduce the program intelligibly and identification signals identifying said program signals, receiver attachment means connected to said antenna terminals for intercepting signals from said transmitter for enabling any commercial television receiver to be integrated into said subscription television system, said attachment means having means for receiving said program signals, inoperative means for translating said received program signals to signals which can be intelligibly reproduced by a commercial television receiver, means connecting the output of said inoperative means to said antenna terminals, means operated by a subscriber for indicating assumption of payment for said program, means for rendering said inoperative means for translating operative responsive to operation of said means for indicating assumption of payment, and means rendered operative responsive to the operation of said means for indicating assumption of payment for recording said identification signals.

11. In a subscription television system of the type wherein a subscriber is required to pay for a program and wherein there are transmitted from a transmitter control signals and program signals in a manner such that a commercial television receiver having antenna terminals for receiving television broadcasts is unable to reproduce the program intelligibly, receiver attachment means connected to said antenna terminals for intercepting signals from said transmitter for enabling any commercial television receiver to be integrated into said subscription television system, said attachment means having means for receiving said program signals and control signals, inoperative means to which said program signals are applied for translating said received program signals to signals which can be intelligibly reproduced by a commercial television receiver, means connecting the output of said inoperative means to said antenna terminals, means responsive to said control signals and an operation by a subscriber for indicating assumption of payment for said program, means for rendering said inoperative means for translating operative responsive to said means for indicating assumption of payment for said program being operated, means for maintaining said inoperative means operative responsive to said received control signals, means for applying said received control signals to said means for indicating assumption of payment and to said means for maintaining said inoperative means operative, means to which said control signals are applied for recording the assumption of payment by said subscriber, and means to render said means for recording operative responsive to the operation of said means for indicating assumption of payment.

12. In a subscription television system of the type wherein there are transmitted in association with program signals control signals in repetitive pulse trains, each pulse train including a starting pulse followed by pulses representing the price of said program each having a duration shorter than said starting pulse, followed by an interval having a duration longer than that of one of said coin demand pulses followed by pulses identifying said program, a circuit at a receiver for utilizing said pulse train comprising a first integrating network, first means for applying said control pulse train to said first integrating network, a first electron tube, means for coupling said first tube to be responsive to output therefrom, a first relay having normally open contacts, a source of operating potential connected to said normally open contacts, means for connecting said first relay to said first tube for closing said normally open contacts when said first tube is rendered operative responsive to output from said first integrating network, a second electron tube having anode, control grid and cathode electrodes, apparatus for establishing a coin demand having a first switch which is closed as long as said apparatus is in its nonactuated condition and a second single-pole double-throw switch having a common swinger arm which is operated to move from one contact to the other contact when said coin demand is satisfied, said swinger arm being connected to said second tube anode, an input resistor connected to the control grid of said second tube, a capacitor connected between one contact of said first switch and said second tube cathode, said other contact of said first switch being connected to the end of said input resistor which is not connected to said second tube control grid, a pricing relay having a relay coil and a pair of normally open contacts, means for connecting one end of said pricing relay coil to the contact to which said second switch swinger arm is normally closed, means including said pricing relay contacts for applying anode potential to said second tube anode through said pricing relay coil from said first relay normally open contacts when closed, means for connecting said coin demand apparatus to said pricing relay contacts for being actuated responsive to the closing of said pricing relay contacts, means for applying said control pulse train to said input resistor whereby said second electron tube is rendered conductive only in response to said starting pulse whereby said coin demand apparatus is actuated and said first switch contacts are opened thereby enabling said first tube to respond to said pricing pulses, recording apparatus connected to the other contact of said second switch, whereby upon satisfaction of the coin demand established in response to said pricing pulse said second switch is actuated to afford recording of said control pulse train.

References Cited in the file of this patent

UNITED STATES PATENTS

| | | |
|---|---|---|
| 2,710,344 | Thompson | June 7, 1955 |
| 2,769,024 | Del Riccio | Oct. 30, 1956 |
| 2,843,655 | Gottfried | July 15, 1958 |
| 2,854,506 | Pickles | Sept. 30, 1958 |

OTHER REFERENCES

Publication: "Fundamental Problems of Subscription Television," Ridenour et al.

Journal of the SMPTE, vol. 61, August 1953; pp. 183–194.